United States Patent Office 3,549,317
Patented Dec. 22, 1970

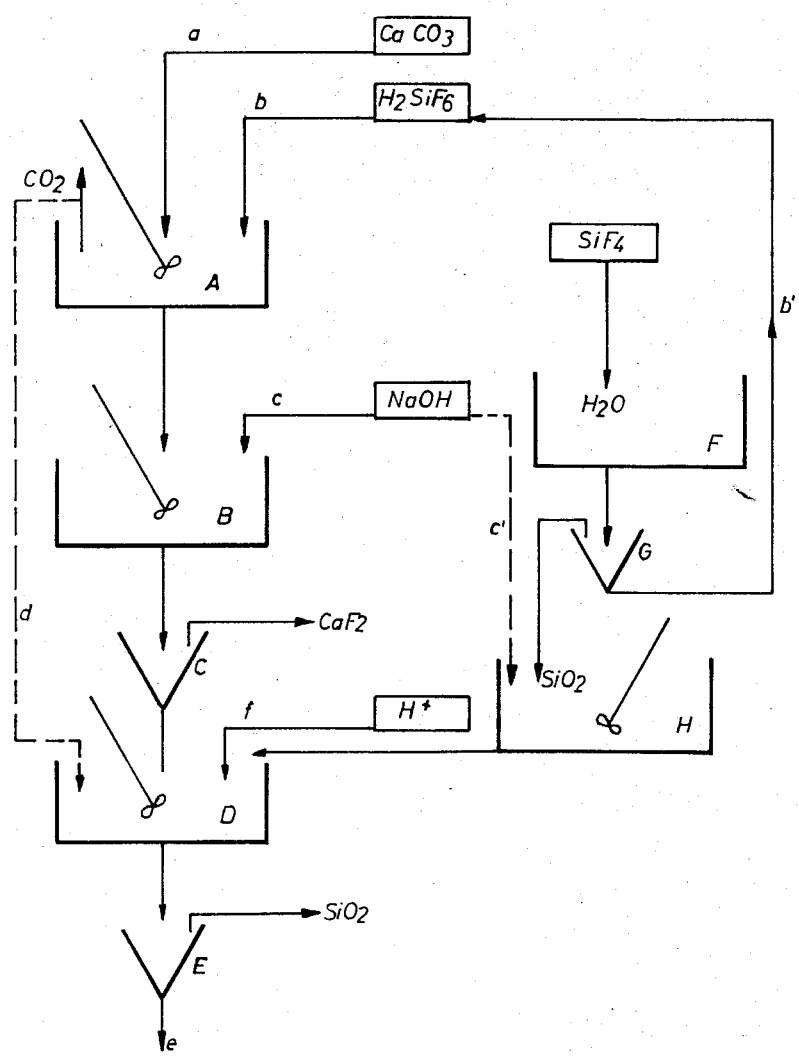

3,549,317
PROCESS FOR UTILIZING FLUOROSILICIC ACID
Ludwig Dorn, Cologne-Stammheim, and Ernst Podschus, Leverkusen, Germany, assignors to Farbenfabriken Bayer Aktiengesellschaft, Leverkusen, Germany, a corporation of Germany
Filed July 17, 1968, Ser. No. 745,621
Claims priority, application Germany, Aug. 12, 1967,
F 53,223
Int. Cl. C01f 11/22; C01b 33/18
U.S. Cl. 23—88                                    11 Claims

ABSTRACT OF THE DISCLOSURE

Process for the production of a silica filler having a specific surface area of about 50–200 m.²/g. and a calcium fluoride precipitate utilizing a solution of $H_2SiF_6$ and/or $Na_2SiF_6$.

BRIEF SUMMARY OF INVENTION

Process for the production of a silica filler, e.g. having a specific surface area of between about 50–200 m.²/g., and calcium fluoride by the steps of (a) reacting fluorosilicic acid ($H_2SiF_6$), and/or sodium fluorosilicate ($Na_2SiF_6$), with a concentration of e.g. 10–40% by weight in aqueous medium with calcium carbonate having a concentration of at least about 100 g. of $CaCO_3$/liter in a corresponding molar ratio of $H_2SiF_6$ and/or $Na_2SiF_6$ to $CaCO_3$ of 1:3 to 1:2, at a temperature of at least about 50° C., preferably by adding the $H_2SiF_6$ and/or $Na_2SiF_6$ solution to the $CaCO_3$ suspension, to form $CaF_2$ and $SiO_2$ with liberation of $CO_2$, (b) reacting the resulting still hot $CaF_2$ and $SiO_2$-containing reaction mixture from step (a) with at least about 10% sodium hydroxide, in an amount of between about 1–3 mols of NaOH per mol of $SiO_2$ present, and separating the resulting silicate solution from the $CaF_2$ precipitate, and (c) precipitating the silica filler from said silicate solution from step (b) at a temperature above about 50° C., by gradual, dilution with a mineral acid to neutralize said solution to a pH value of between about 7–9, preferably, with optimal use of fluorosilicic acid in a form prepared by prior introduction of $SiF_4$ into water or dilute fluorosilicic acid to hydrolyze the $SiF_4$ until a concentration therein of at least 10% by weight $H_2SiF_6$ is obtained, and with optional recovery and washing of the silica precipitate resulting from such hydrolysis, followed by dissolving thereof in sodium hydroxide solution at a $SiO_2$/NaOH ratio of more than about 1:0.5 and combining of the resulting solution with the silicate solution from step (b) prior to dilution with acid in step (c).

The present invention relates to a process for exploiting fluorosilicic acid.

The $SiF_4$ formed in the production of hydrofluoric acid and phosphates is usually converted into fluorosilicic acid and fluorosilicates. However, since the market for these products is not very large, numerous processes have already been proposed for producing hydrofluoric acid or fluorides and silica from $SiF_4$ and silicofluorides.

One of these processes starts with highly dilute fluorosilicic acid, initially obtained from hydrolysis of $SiF_4$, and reacts it with calcium carbonate to form $CaF_2$ and a colloidal solution of silicic acid from which a silica gel is obtained by evaporation. Apart from the disadvantage of a low volume/time yield, tests conducted with this process show that the $CaF_2$ obtained is difficult to filter from the colloidal silicic acid, in addition to which considerable costs are involved in evaporating the highly dilute silica sol which remains.

In another process, $SiF_4$ is introduced into water, yielding silica and fluorosilicic acid which, after removal of the silica, is then reacted with $CaCO_3$ to give $CaF_2$ and silicic acid. After filtration and drying, the resulting mixture is reacted with sulfuric acid to give, besides $CaSO_4$ and HF, also $SiF_4$ which is again introduced into water and the process repeated. The silica obtained from the hydrolysis of $SiF_4$ is intended to be used as a filler. Unfortunately, the silica obtained in this way is not competitive in its properties with the silica fillers that are currently available on the market, particularly in their capacity as fillers for reinforcing rubbers.

A process for reacting fluorosilicic acid and/or sodium fluorosilicate to give a silica filler and calcium fluoride by reacting fluorosilicic acid and/or sodium fluorosilicate in aqueous solution or suspension with calcium carbonate, has now been found in which:

(a) Fluorosilicic acid or sodium fluorosilicate is reacted with calcium carbonate at a temperature of at least 50° C. and with a concentration of at least 100 g. of $CaCO_3$/l. in a molar ratio of about 1:3 or 1:2, respectively;

(b) The reaction mixture is reacted while still hot with at least 10% sodium hydroxide in a quantity of from 1 to 3 mols of NaOH per mol of $SiO_2$, and the resulting silicate solution is separated from the $CaF_2$-deposit; and (c) A silicate filler is precipitated from the silicate solution at a temperature above 50° C. by the gradual addition of acid up to a pH value of from 7 to 9.

The starting material for the production of fluorosilicic acid, which is generally handled in the form of a 20 to 30% solution, is $SiF_4$ which is formed from the silica present in fluorspar or apatite. In the hydrolysis of $SiF_4$, silicic acid and fluorosilicic acid are formed in accordance with the equation:

(I)     $3SiF_4 + nH_2O = SiO_2 \cdot aq. + 2H_2SiF_6$ 

The silica formed during this reaction can be filtered fairly readily in the presence of fairly high concentrations of $H_2SiF_6$. As already mentioned, however, it is not suitable for use in the reinforcing of rubbers or as a paper filler. In connection with the utilization of fluorosilicic acid and/or of sodium silicofluoride in accordance with the invention, it has proved to be of advantage to dissolve the silica obtained from $SiF_4$ in the preceding hydrolysis stage under the effect of heat in at least 5%, and preferably from 5 or 7 to 15%, sodium hydroxide solution in a ratio of $SiO_2$/NaOH of more than about 1:0.5 e.g. $Na_2O.2SiO_2$ to $Na_2O.4SiO_2$ after the $H_2SiF_6$ has been washed out, and to process the resulting silicate solution in admixture with the silicate solution formed during the reaction of $H_2SiF_6$ and/or $Na_2SiF_6$ with $CaCO_3$ and NaOH to form silica fillers. When fluorosilicic acid is used in a form prepared by the prior introduction of $SiF_4$ into a hydrolysis medium selected from the group consisting of water and dilute fluorosilicic acid, for corresponding hydrolysis of such $SiF_4$ in said medium, it is advantageous to form a concentration therein of at least 10% by weight $H_2SiF_6$.

In theory, the following equations are applicable to the reaction of $H_2SiF_6$ with $CaCO_3$ and NaOH according to the invention:

(II)   $H_2SiF_6 + 3CaCO_3 + NaOH$
        $= 3CaF_2 + NaHSiO_3 + H_2O + 3CO_2$ 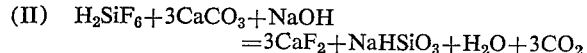

(III)  $6NaHSiO_3 + H_2SiF_6 = 6NaF + 7SiO_2 \cdot aq. + 4H_2O$ 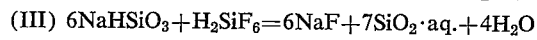

In the first stage, fluorosilicic acid, preferably in the form of an approximately 10 to 40% solution, is reacted while stirring with $CaCO_3$ preferably in a concentration of from about 100 or 200 to 300 g./l., advantageously in the form of powdered calcite, at a temperature of about 50° C. and preferably at a temperature of from about 50 or 60° C. to the boiling temperature. The end of the reaction is clearly recognizable from the cessation of the $CO_2$-evolution. The reaction can be carried out either continuously or in batches. In cases where the reaction is carried out in batches, the order in which the additions are made is not important. However, it is preferred initially to introduce the $CaCO_3$ suspension for reasons of minimizing corrosion. Completion of this reaction is followed by the second stage, namely, dissolving the silica formed in the first stage to give a sodium silicate solution. In this connection, it is of advantage to allow the still hot reaction mixture to flow with stirring into an at least 10% sodium hydroxide solution and preferably into an approximately 10 to 50 or 20 to 50% sodium hydroxide solution, approximately 1 to 3 mols of NaOH being used per mol of $SiO_2$. The mixture is then stirred for at least another 30 minutes, during which it is with advantage heated to temperatures above 50° C. and preferably to temperatures of from 60° C. to the boiling temperature. It is then filtered and the calcium fluoride deposit that is separated is washed.

The calcium fluoride, which contains approximately 50% or less of water, is dried, optionally ground and then reacted in known manner with concentrated sulfuric acid, for example, by the method used to produce hydrofluoric acid, i.e. to form $CaSO_4$ and HF. The sodium silicate-containing filtrate together with the washing filtrate and, optionally, the silicate solution emanating from the treatment with sodium hydroxide of the silica formed in the preceding $SiF_4$ hydrolysis stage, then has added thereto at a temperature above 50° C., e.g. 55 to 80° C. an acid, preferably fluorosilicic acid or other mineral acids such as sulfuric acid, and optionally at least to some extent $CO_2$ in order to precipitate silica with the properties of a filler. The acid is gradually added with stirring at a substantially uniform rate over a period ranging from some 10 minutes up to 2 hours, addition of the acid being terminated after a pH-value of between about 7 and 9 has been reached. The suspension is then maintained for 10 to 180 minutes to a temperature of at least about 90° C. up to the boiling temperature and subsequently filtered. The silica is washed, dried—preferably by spray-drying—and ground. The washing stage is with advantage followed by neutralization with a mineral acid, e.g. sulfuric acid so as to adjust to a weakly acid pH value of about 5 to 6.5, followed again by washing.

The filterability of the calcium fluoride left after the second stage of the process from the silicate solution can be improved by the addition of known flocculating agents, such as, for example, cation-active flocculating agents, for example, polyamines.

The filterability of the calcium fluoride formed from sodium silico-fluoride and separated from an NaF-containing sodium silicate solution is better from the outset so that there is no need in this case to add flocculating agents.

A small amount of NaF is also present in the silicate solution formed from $H_2SiF_6$ because the reaction does not proceed strictly in accordance with Equation II given hereinabove. A little silicic acid is always left behind in the calcium fluoride, and a little NaF in the silcate soluton. 80 to 95% of the Si present in the fluorosilicic acid or in the fluorosilicate is separated in the form of a silicate solution however.

The process according to the invention is also suitable for working up sodium silicofluoride, even contaminated material of the kind precipitated as a secondary product in the wet process for the production of phosphoric acid, in conjunction with the production of hydrofluoric acid from fluorspar and sulphuric acid. The resulting calcium fluoride which contains the impurities such as, for example, a few percent of calcium phosphate, is used in the hydrofluoric acid process, optionally in conjunction with fluorspar. The reactions that take place where $Na_2SiF_6$ is used may be represented, for example, by the following equations:

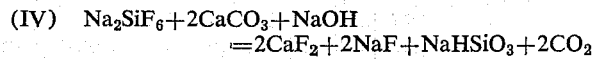
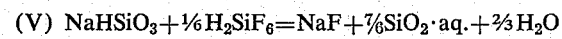

(IV) $Na_2SiF_6 + 2CaCO_3 + NaOH$
$= 2CaF_2 + 2NaF + NaHSiO_3 + 2CO_2$ (V) $NaHSiO_3 + \frac{1}{6}H_2SiF_6 = NaF + \frac{7}{6}SiO_2 \cdot aq. + \frac{2}{3}H_2O$ In this case, 1 mol of NaOH was used for 1 mol of $Na_2SiF_6$. With a higher ratio of sodium hydroxide to silicofluoride, the $Na_2O/SiO_2$ and $Na_2O/H_2SiF_6$ ratios are modified accordingly. However, it is not advisable to use less than about 1 mol of NaOH per mol of $Na_2SiF_6$ because otherwise the amount of silicic acid left in the $CaF_2$ is too high. Approximately 1 to 3 mols of NaOH, in the form of an approximately 10 to 50 or 20 to 50% solution, are preferably used per mol of $SiO_2$.

The reaction mixture of powdered calcite with the sodium silicofluoride suspensions is with advantage introduced into the sodium hydroxide solution already present.

Since the solubility of NaF amounts only to about 1 mol per litre, it is of advantage to adjust the reaction concentration and the quantity of washing water used in such a way that, during filtration of the $CaF_2$, the filtrate and the washing water accumulate in such quantities that the NaF formed in the first stage and the NaF formed during subsequent precipitation of the filler can still just be dissolved, i.e. the quantity of water used during the reaction, based on 1 mol of $Na_2SiF_6$, is just sufficient to enable the reaction mixture to be readily stirred, the $CaF_2$ filtered off being washed until the required volume has been obtained. According to the above reaction equations, therefore, filtrate and washing water should together make up approximately 3 liters per mol of $Na_2SiF_6$ used so that the quantity of NaF formed initially remains in solution with the sodium silicate. The NaF formed also remains in solution during the subsequent precipitation of the silica filler.

Instead of $Na_2SiF_6$ or $H_2SiF_6$ alone, it is of course also possible to use mixtures of these two substances as starting material. The quantity of $CaCO_3$ required is apparent from the reaction equations. The excess $CaCO_3$ to be used need only amount to a few percent.

The dilute and at most approximately 1 molar NaF solutions formed during the working up of the silicate solution into silicate fillers may be used in the production of cryolite, or alternatively may even be converted into $CaF_2$ by reaction with lime while any $CaF_2$ may be treated with mineral acid to produce hydrofluoric acid in the conventional manner.

The reaction of $H_2SiF_6$ is explained once again in the drawing with reference to a reaction diagram: $H_2SiF_6$ solution flowing in through a line $b$ is reacted in an agitation tank A with a $CaCO_3$ suspension which has already been run into the tank A from a line $a$. The reaction mixture is transferred from the tank A into a tank B containing sodium hydroxide which was fed in via line $c$. The $CaF_2$ is separated and washed in a suction filter C, and the resulting filtrate is treated with acid in a tank D in order to precipitate the $SiO_2$ filler. The $CO_2$ removed from the tank A through a line $d$ may be used for this purpose, in which case filtration in filter C need only be followed by the addition of acid through the line $f$ in the quantities sufficient to adjust a weakly acid pH value. The resulting $SiO_2$ precipitate is separated in a separator E. The NaF-containing solution run off through the line $e$ may be used, for example, for the production of cryolite. The process described above may be combined with the production of $H_2SiF_6$ from $SiF_4$, in which case $SiF_4$ is reacted with water in a tank F. The reaction mixture is separated from $SiO_2$ in a separator G. In a tank H, the $SiO_2$ is dissolved in sodium hydroxide solution from a line $c'$ and the resulting solution is transferred to the tank D, whilst the $H_2SiF_6$ solution flows from the tank F through the line $b'$ into the tank A where it is reacted.

EXAMPLE 1

400 g. (4 mols) of powdered calcite ($CaCO_3$) were suspended in 2 litres of water in a 5-litre-capacity vessel, and the resulting suspension was heated to 95° C. 376 g. (2 mols) of powdered sodium fluorosilicate ($Na_2SiF_6$) were then added in portions to the suspension over a period of 30 minutes. The reaction was accompanied by the vigorous evolution of $CO_2$ gas. The reaction mixture was stirred for another 60 minutes at 95° C., and slowly poured with stirring over a period of 5 minutes into 750 ml. of hot, 4-molar sodium hydroxide. The suspension was stirred for another 90 minutes at 95° C., and filtered off through a pre-heated suction filter. 1 litre of filtrate (evaporation losses) containing 79 g. of $SiO_2$, 82 g. of NaOH and 55 g .of NaF was obtained. The filter cake was washed in portions with 6.3 litres of hot water on the filter and the water used for washing was combined with the filtrate. The filtrate as a whole (7.3 l.) contained 113 g. (1.88 mols) of $SiO_2$, 102.5 g. (2.56 mols) of NaOH and 182 g. (4.33 mols) of NaF.

The filter cake (530 g.) was dried at 120° C. 306 g. of powdered product were obtained. It consisted of 296 g. (approx. 3.8 mols) of $CaF_2$, 86 g. of $SiO_2$, 0.9 g. of CaO and 0.5 g. of $Na_2O$. This corresponds to a proportion by weight of 2.8% of $SiO_2$ in the calcium fluoride. Based on the quantity of $SiO_2$ used in the form of $Na_2SiF_6$, approximately 6% was left undissolved in the solid.

The filtrate was then combined with intensive stirring over a period of 15 minutes at 60° C. with 140 ml. of a 2.8 molar $H_2SiF_6$ solution that was uniformly run in. The pH value of the reaction mixture dropped to 8.5. This was followed by some thirty minutes' heating to boiling point, after which the silica precipitated was filtered off, washed, adjusted to pH 6 with dilute sulfuric acid, dried at 110° C. and ground.

146 g. of silica filler with a water content of 9.8% (heating loss) and a specific surface of 163 m.$^2$/g. according to BET were obtained. The filler thus obtained was eminently suitable for reinforcing rubbers. The filtrate (6.4 l.) contained 40 g. of NaF and 0.5 g. of $SiO_2$ per litre.

EXAMPLE 2

30 kg. (300 mols) of calcite were suspended in 100 l. of water in a 200 litre-capacity vessel equipped with a propellor agitator and the resulting suspension was heated to between 90 and 95° C. 35.8 litres of a 2.8 molar aqueous $H_2SiF_6$ solution were then added over a period of 100 minutes. The reaction is characterized by the vigorous evolution of $CO_2$. The reaction mixture was then heated with stirring for another 30 minutes to between 95 and 100° C., the suspension was introduced with stirring over a period of 30 minutes into 25 litres of a 19.6% hot sodium hydroxide solution (approximately 150 mols of NaOH), followed by another 15 minutes' stirring at 95° C. 36 g. of a cation-active-polyamine flocculating agent were added to the hot suspension which was then filtered on a filter press and washed.

The filter cake which contained approximately 45% of water was dried at 120° C. 24 kg. of calcium fluoride containing 3.6% of $SiO_2$ and 115 litres of filtrate containing 0.85 mol of $(Na_2O)_{0.73}.SiO_2$ and approximately 7 g. of NaF per litre were obtained.

A silica filler with a specific surface of 100 m.$^2$/g. according to BET was obtained from this solution over a period of 45 minutes by the uniform addition thereto with intensive stirring of 3-normal sulfuric acid at 60° C. followed by drying.

What is claimed is:

1. Process for the production of a silica filler and calcium fluoride which comprises
   (a) reacting a member selected from the group consisting of fluorosilicic acid, sodium fluorosilicate, and mixtures thereof, in aqueous medium with calcium carbonate at a temperature of at least about 50° C. and with a concentration of at least about 100 g. of $CaCO_3$/liter in a corresponding molar ratio of said member to calcium carbonate of between about 1:3 to 1:2,
   (b) reacting the resulting still hot $CaF_2$ and $SiO_2$-containing reaction mixture from step (a) with at least about 10% sodium hydroxide in an amount of between about 1–3 mols of NaOH per mol of $SiO_2$ present and separating the resulting silicate solution from the $CaF_2$ precipitate, and
   (c) precipitating the silica filler from said silicate solution from step (b) at a temperature above about 50° C. by the gradual dilution with acid to neutralize said solution to a pH value of between about 7–9, whereby to produce a silica filler having a specific surface area between 50–200 m.$^2$/g.

2. Process according to claim 1 wherein said member is reacted in step (a) at a concentration in water of between about 10–40% by weight with calcium carbonate having a concentration in water of between about 100–300 g./liter, at a temperature between about 50° C. and the boiling temperature.

3. Process according to claim 2 wherein said calcium carbonate is provided in the form of an aqueous suspension and said member in aqueous medium is added thereto.

4. Process according to claim 2 wherein said member is an aqueous solution of $H_2SiF_6$ used in a molar ratio of $H_2SiF_6$ to $CaCO_3$ of about 1:3.

5. Process according to claim 2 wherein said member is an aqueous suspension of $Na_2SiF_6$ used in a molar ratio of $Na_2SiF_6$ to $CaCO_3$ of about 1:2.

6. Process according to claim 2 wherein said resulting reaction mixture is reacted in step (b) with sodium hydroxide solution having a concentration of between about 10–50% by weight NaOH at a temperature between about 50° C. and the boiling temperature.

7. Process according to claim 6 wherein said member is fluorosilicic acid which is used in a form prepared by the prior introduction of $SiF_4$ into a hydrolysis medium selected from the group consisting of water and dilute fluorosilicic acid for corresponding hydrolysis of such $SiF_4$ in said medium until a concentration therein of at least 10% by weight $H_2SiF_6$ is obtained and wherein the silica precipitate correspondingly formed during such hydrolysis is washed, then dissolved in sodium hydroxide solution at a $SiO_2$/NaOH ratio of more than about 1:0.5 and thereafter combined with the silicate solution from step (b) prior to dilution with acid in step (c).

8. Process according to claim 6 wherein said silicate solution is diluted with acid in step (c) by uniformly introducing acid therein up to a pH value of between about 7–9.

9. Process according to claim 6 wherein carbon dioxide is liberated during the step (a) reacting which is collected and introduced into said silicate solution in step (c) to neutralize partially said solution.

10. Process according to claim 6 wherein fluorosilicic acid is introduced into said silicate solution in step (c) to neutralize said solution.

11. Process according to claim 1 for the production of a silica filler and calcium fluoride which comprises
   (a) reacting in water a member selected from the group consisting of $H_2SiF_6$, $Na_2SiF_6$ and mixtures thereof, at a concentration of between about 10–40% by weight, with $CaCO_3$ at a concentration of between about 100–300 g./liter, and in a corresponding molar ratio of said member to $CaCO_3$ of between about 1:3 to 1:2, at a temperature between about 50° C. and the boiling temperature, to form $CaF_2$ and $SiO_2$ with liberation of $CO_2$,
   (b) reacting the resulting still hot reaction mixture from step (a) with NaOH solution having a concentration of between about 10–50% by weight NaOH and in an amount of between about 1-3 mols of NaOH per mol of $SiO_2$ present and separating the resulting silicate solution from the $CaF_2$ precipitate, and (c) preparing the silica filler from said silicate solution from step (b) by precipitating, removing said precipitate from the reaction medium, washing, drying and grinding, wherein the precipitation is effected by gradually neutralizing said silicate solution with an acidic medium selected from the group consisting of sulfuric acid, carbon dioxide, fluorosilicic acid and mixtures thereof to a pH-value of between about 7-9 at a temperature of between about 50 and 80° C. and maintaining said precipitated solution for about 10 to 180 minutes at a temperature from about 90° C. to the boiling temperature.

References Cited

UNITED STATES PATENTS

| | | | |
|---|---|---|---|
| 1,382,165 | 6/1921 | Bishop | 23—110X |
| 1,634,122 | 6/1927 | Stevenson | 23—110X |
| 2,561,304 | 7/1951 | Hazel | 23—182 |
| 2,588,853 | 3/1952 | Kumins et al. | 23—182 |
| 2,601,235 | 6/1952 | Alexander et al. | 23—182 |
| 2,780,521 | 2/1957 | Butt | 23—182X |
| 2,780,523 | 2/1957 | Gloss | 23—88 |
| 2,881,049 | 4/1959 | Erbe | 23—110 |
| 3,445,189 | 5/1969 | Maat | 23—182 |

EDWARD STERN, Primary Examiner

U.S. Cl. X.R.

23—110, 182